United States Patent [19]

Lavie

[11] 4,358,469
[45] Nov. 9, 1982

[54] PROCESS OF MANUFACTURE OF SUGAR CARAMEL IN POWDERED FORM

[76] Inventor: Louis F. Lavie, 6 Avenue Dapples, Lausanne, Vaud, Switzerland

[21] Appl. No.: 238,648

[22] Filed: Feb. 26, 1981

[30] Foreign Application Priority Data

Jul. 4, 1980 [CH] Switzerland .......................... 5174/80

[51] Int. Cl.³ ................................................ A23L 1/27
[52] U.S. Cl. ...................................... 426/250; 127/29; 426/470; 426/658; 426/660
[58] Field of Search ............... 426/660, 658, 564, 470, 426/561, 572, 250, 590, 591; 127/29, 31

[56] References Cited

U.S. PATENT DOCUMENTS 2,582,261  1/1950  Longenecker .
2,767,108  10/1956  Fetzer .
3,385,733  7/1964  Ackermann .
3,618,588  11/1971  Anwar et al. ........................ 426/590

FOREIGN PATENT DOCUMENTS 694206   9/1964  Canada .............................. 426/658
1423285  11/1965 France .............................. 426/658
577994   7/1946  United Kingdom .
696736   11/1951 United Kingdom .
759963   5/1954  United Kingdom .

Primary Examiner—Raymond N. Jones
Assistant Examiner—George C. Yeung
Attorney, Agent, or Firm—Stevens, Davis, Miller & Mosher

[57] ABSTRACT

A powdered sugar caramel composition is prepared by heating the sugar to 140°–200° C., cooling the viscous mass to about 120° C., adding an ammonium salt which is volatile at this temperature, such as ammonium carbonate to precolor the mass, foaming the mass, and cooling the foam to ambient temperature. The cooled foam is then powdered.

5 Claims, No Drawings

PROCESS OF MANUFACTURE OF SUGAR CARAMEL IN POWDERED FORM

This invention relates to a method for producing caramel in powdered form. Caramel of white sugar (sacharose) is well known and utilized in confectionery and the preparation of beverages. Up to the present, this caramel has always been obtained and utilized in the form of a viscous mass which is difficult to handle and to portion out.

When attempts have been made to prepare caramel in a powdered form, the hygroscopic nature of caramel has posed several problems since it causes agglomeration of the powder particles and may even result in conglomeration of the powder into a lump.

Furthermore, certain beverages based on cola contain phosphoric acid, an indispensable ingredient for conferring desired organoleptic properties on the beverage. However, because the phosphoric acid is in the form of a viscous liquid, it has been difficult, if not impossible, to incorporate it in powdered sugar caramel intended for the preparation of such beverages while at the same time retaining the dry powder form of the sugar caramel.

An object of this invention is to provide a process for obtaining sugar caramel in powdered form. The sugar may be from any source, e.g., cane, corn, etc. The powdered caramel produced is easy to transport and to handle, particularly in confectionery, in the preparation of beverages and in automatic apparatus, such as fountains, which mix ingredients including the powdered caramel with a certain quantity of water to deliver a beverage.

Another object of the invention is to provide a process for obtaining sugar caramel in a powdered form which may be sealed in a package without the necessity of vacuum packing, but which no longer takes up atmospheric moisture.

Another object of the invention is to provide a process for obtaining a sugar caramel composition in essentially dry powdered form even though it contains such normally liquid ingredients as phosphoric acid.

According to the invention, these objects are achieved by a process in which sugar is heated to a temperature between 140° and 200° C. The viscous caramel mass thus obtained is allowed to cool to about 120° C., and an ammonium salt which is volatile or in a gaseous form at this temperature is added to this mass in sufficient amount to precolor or darken the viscous mass to the desired level of brownness. Then, while maintaining the temperature of the hot viscous mass between about 100°-110° C., 0.5 to 5 weight percent sodium bicarbonate and 0.5 to 5 weight percent of a comestible acid, such as phosphoric acid, citric acid or tartaric acid, are added to foam the hot viscous mass. Some increase in temperature may be desirable at this step. The foam is then allowed to cool to room temperature, and is then powdered. The weight percentages given are by weight of the total sugar used to form the caramel composition.

Preferably, the ammonium salt added is ammonium carbonate, but other ammonium salts could be utilized, and their introduction may be by a stream of inert gas. A convenient range for the ammonium carbonate is 0.01 to 1 weight percent of the sugar used to form the caramel composition. The prefered range is 0.03 to 0.07 weight percent and the most preferable amount in 0.05 weight percent.

Phosphoric acid, beyond the amount which might be required (with the sodium bicarbonate) for foaming may be added, possibly accompanied by sugar, to the hot mass. The quantity of phosphoric acid added is preferably about 5 to 25 g per 1,000 g of total sugar used for forming the caramel. There can likewise be added additional sodium bicarbonate and an acid, particularly citric or tartaric acid, beyond that necessary for foaming, to obtain a powdered caramel composition which effervesces in water.

EXAMPLE 950 g of white sugar are heated to 160°-200° C. with continuous stirring, to obtain a viscous, white-yellow liquid. Then about 0.05% (e.g., 0.5 g) ammonium carbonate is added when the mass has cooled to a temperature of 120° C. Effervescence is then observed, with release of gas. When the effervescence has ended, 50 g of additional sugar are added, mixed with 5–20 g of phosphoric acid. When the brown mass has cooled to a temperature of about 100° C., 5 g of powdered citric acid are added as well as 5 g of sodium bicarbonate to foam the mass. Mixing and heating to 120° C., optionally under a partial vacuum, are continued for 20 minutes. The foamed mass is then allowed to cool and the resulting solid mass is pulverized.

Citric acid, and possibly tartaric acid, can at least partially replace the phosphoric acid added for organoleptic purposes, according to the acidity desired in the beverage to be prepared with the pulverulent caramel composition obtained. It is evident that this composition can contain still further ingredients, such as aromas and the like.

Where an effervescent composition is desired, to have maximum effervescence, the ratio between the reactants should be stiochiometric. In the case of a mixture of citric acid and sodium bicarbonate, the stoichiometric ratio is 192 parts of acid to 252 parts of bicarbonate. For a composition intended to be ingested, excess acid may be added to obtain a product which is agreeable and fresh. In general 35% excess of acid is added with respect to the theoretical weight necessary for the reaction (three molecules of sodium bicarbonate for one molecule of citric acid). Thus for a typical formulation, one would have 1.30 g of citric acid and 1.26 g of sodium bicarbonate. The effervescent acid/carbonate mixture is advantageously utilized in a proportion of 10% of the total weight of the basic composition.

I claim:

1. Process of manufacturing of sugar caramel compositions in essentially dry powdered form, comprising heating sugar to a temperature between 140° and 200° C., cooling the mass of viscous caramel thus obtained to about 120° C., adding an ammonium salt which is volatile or in gaseous form at this temperature in an amount sufficient to precolor the viscous mass and then transforming the hot viscous mass into a foam by adding a mixture of sodium bicarbonate and a comestible acid to react with said sodium bicarbonate, cooling the foam to room temperature to form a solidified foam and powdering the solidified foam.

2. Process according to claim 1, wherein the added ammonium salt is ammonium carbonate.

3. Process according to claims 1 or 2, wherein phosphoric acid, is added to the hot mass in addition to said comestible acid to react with said sodium bicarbonate.

4. Process according to claim 3, wherein the quantity of phosphoric acid is about 5 to 25 g per 1000 g of total sugar.

5. Process according to one of claims 1, wherein the comestible acid is selected from the group consisting of citric, tartaric and phosphoric acid.

* * * * *